Inventor
André Louis Aimé Fortier
By Glenrock, Downing Seebold
Attorneys

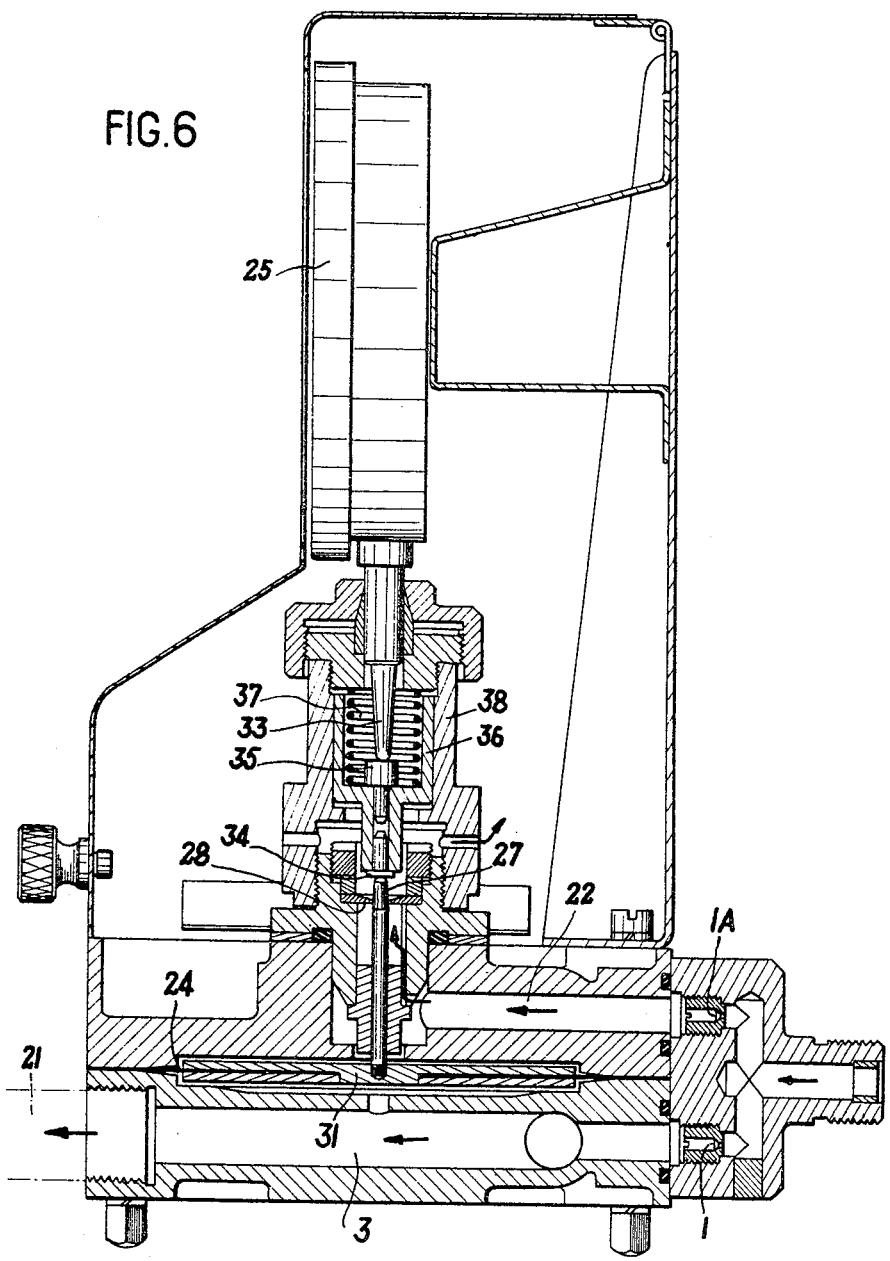

United States Patent Office 3,490,058
Patented Jan. 13, 1970

3,490,058
PNEUMATIC MEASURING APPARATUS
André Louis Aimé Fortier, 12 Rue Leon Cambillard, Clamart, France
Filed Oct. 9, 1967, Ser. No. 673,854
Claims priority, application France, Oct. 11, 1966, 79,437
Int. Cl. G01b 13/08
U.S. Cl. 73—37.5      6 Claims

ABSTRACT OF THE DISCLOSURE

A jet device for pneumatic apparatus, especially for measuring, testing or control, in which a jet body is traversed by a pipe for the flow of a current of fluid. The pipe has a cylindrical channel of calibrated diameter opening in the direction of the upstream part of the current in a smooth, bell-mouthed orifice and terminating in the direction of the downstream part of the current in a non-restrictive orifice.

---

This invention relates to pneumatic apparatus for measuring, testing or control, and adapted to function under a pressure supplied at at least two atmospheres. The invention also relates to jet device for such pneumatic apparatus.

Many apparatuses of this kind use the principle of locating two orifices in series, the first orifice being fed from a source of compressed air, while the second communicates with the atmosphere through a passage whose cross-section has an area which is a function of the dimension to be measured or controlled of a workpiece. For given values of the pressure supply at the first orifice, and a given value of the cross-section of the latter, the absolute pressure which is established in permanent working conditions, in the space between the two orifices, is a function of the area of the escapement surface of the second orifice, to the atmosphere, and, in conseqence, of the value to be measured or controlled.

In particular, if the upstream orifice has the usual form of a jet device, i.e. of a hole pierced in a wall whose thickness is of the order of the size of the diameter of the hole, it can be proved that a certain coefficient C, or discharge coefficient of the jet device, presents discontinuity for a value in the neighbourhood of 0.5 of the ratio of the pressure in the space between the two orifices to the supply pressure. In addition, the presence of a slight chamfer on the upstream edge of the jet device considerably modifies the values of this coefficient and, in consequence, the relationship between the ratio of the downstream and upstream pressures of this jet device and the ratio of the cross-sections of the two orifices, when the ratio of the said pressures is above 0.5.

When high precision and feasibility of measures, and the interchangeability of the upstream orifice are desired, it is necessary, when a jet device is used, to limit the above ratio of pressures to a maximum value of 0.5. For a given supply pressure, if it is desired, besides, to have the pressure prevailing between the two orifices higher than two atmospheres, so as to benefit from all the advantages of high pressure flows, the interval of the variations of the surface area of the downstream orifice is therefore limited, on the one hand, by the fact that the said pressure is higher than two atmospheres, and, on the other hand by the fact that the aforesaid ratio of pressures must be less than 0.5. Thus, for example, for a supply pressure of six atmospheres, the ratio of the cross-sections of the upper and lower orifices must lie between 2 and 3.

An object of the present invention is to increase the extent of the field of possible measurements for a given pressure supply and consumption of air, and also the effect correct interchangeability of the upstream orifices in a repetitive production of pneumatic measuring devices based on the principle in question.

To this end, according to the invention, the upstream jet device, notably for the flow of high pressure air with variable outflow without discontinuity as a function of pressure, is made up of a jet body traversed by a flow conduit comprising a cylindrical channel of calibrated diameter exhausting in the upstream direction through a smooth, bell-mouthed orifice and terminating, in the downstream direction in a non-resistrictive orifice.

Thanks to this particular structure of the jet device, there is obtained a discharge coefficient C, which is substantially constant and is close to unity.

Thus, for example, for a pressure supply of six atmospheres, the interval of the variations of the ratio of the cross-sections of the measuring orifices to the upstream orifice lies between about 0.6 and 3, i.e. for the same consumption of compressed air and the same downstream orifice, the measuring interval is more than doubled when the conventional upstream jet device is replaced by a jet device of the structure according to the invention. Moreover, such jet devices therefore become completely interchangeable.

Another advantage of the jet device according to the invention is that it can be characterized simply by its diameter. One single measure of diameter (which can, moreover, be effected by pneumatic means) thus allows machined jet devices to be placed in different classes of perfectly interchangeable identical jet devices without the necessity of a complete re-calibration of the whole apparatus each time its upstream jet device is changed.

In an advantageous embodiment, the cylindrical channel has a length of between 0.5 to 1 times its diameter.

According to another characteristic of the invention, the upstream bell-mouthed orifiec of the channel has a toric edge whose radius of curvature is between 0.25 and 1 times the calibrated diameter of the cylindrical channel.

In a particular embodiment, the downstream orifice of the channel is made up of a conical bell mouth designed to reduce the speed of the jet and, in consequence, to increase stability of the jet.

The invention also includes a process of manufacturing such jet devices, comprising piercing a cylindrical hole in a metallic jet body, forcing into said hole a punch calibrated to the contours of the bell-mouthed orifice with the toric edge and to the diameter of the cylindrical channel, and machining the truncated conical bell mouth after withdrawal of the said punch.

In a particular working embodiment, the conical bell mouth is machined by the simple removal of the burrs of metal pushed up by the punch.

The invention also envisages pneumatic devices, especially measuring, testing and control devices, including at least one jet device as hereinbefore described.

The embodiments of the invention will now be described, by way of example, with reference to the accompanying drawings, in which:

FIG. 6 shows, in vertical section, an embodiment of a device of the nature of that shown in FIG. 5.

Figure 1:
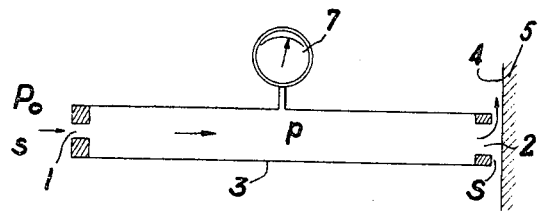
FIG. 1 illustrates the principle of locating two orifices in series in pneumatic measuring devices.

Referring now to the drawings, throughout which the upstream and downstream jet devices of pneumatic measuring devices in which two jet devices are arranged in series are denoted 1 and 2, respectively, FIG. 1 illustrates the principle of such devices. The jet devices 1 and 2 are located in a pipe 3, the upstream jet device being supplied from a pressure source Po and having a cross-section S, and the downstream or measuring jet device 2 issuing at atmospheric pressure through the medium of a space of cross-section S defined between the downstream face of said jet device 2 and the face 4 which fixes a reading to be registered of a workpiece 5.

The absolute pressure $p$ prevailing in the pipe 3, and which is marked on a manometer 7, allows registration of the value or reading, in question derived from the workpiece.

Figure 2:
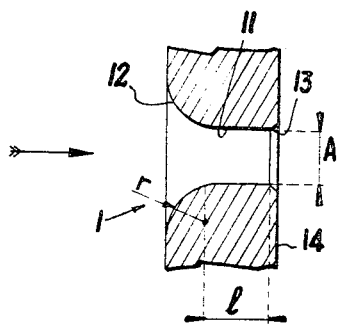
FIG. 2 shows in section the nozzle of a first embodiment of the upstream jet device of FIG. 1.

FIG. 2 shows on a larger scale an embodiment of the nozzle of the upstream jet device 1 according to the invention.

The passage provided by this jet device for the fluid under pressure comprises: a cylindrical part 11 of length L which is included between A/2 and A, A, being the diameter of the said cylindrical part, an upstream bell-mouthed part in this example by a quarter torus whose radius of curvature $r$ is included between A/4 and A, and finally a part 13 in the shape of a truncated cone joining the downstream end of the cylindrical part 11 and a plane face perpendicular to the axis of the orifice. In the example, this truncated conical part 13 is made up by a simple chamfer with the burrs removed.

Such a jet device can be made economically and yet precisely, because of the fact that it can be given its final form by a punch which upsets the metal, the chamfer 13 being made by a scraper.

Figure 3:
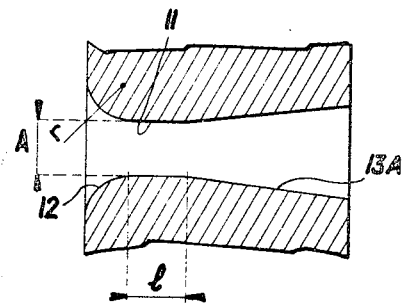
FIG. 3 shows, likewise in section, the nozzle of a second embodiment of the upstream jet device.

In the modification shown in FIG. 3 there can be seen the quarter torus part 12 of the embodiment of FIG. 2, followed by the cylindrical part 11, but the latter then opens into a truncated conical part 13A of much greater length than the chamfer 13 of FIG. 2, forming a diffuser for reduction of the speed of the jet of fluid and thus improving the stability of the said jet.

Figure 4:
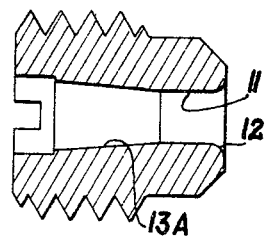
FIG. 4 is a section of the entire jet device showing the nozzle of FIG. 3.

FIG. 4 shows the whole of a jet device having, for the flow of fluid, the characteristics of the jet device shown in FIG. 3, and which is intended for use in the machine shown in more detail in FIG. 6.

Figure 5:
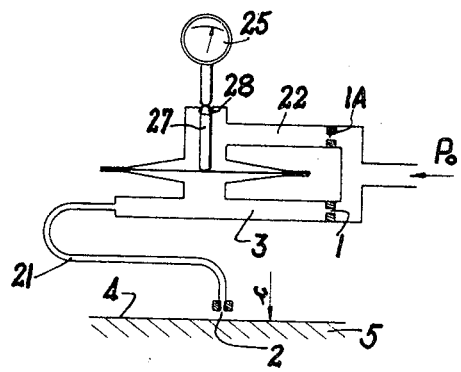
FIG. 5 shows, very schematically, a pneumatic measuring device using the jet location of FIG. 1.

FIG. 5 shows, very schematically, a pneumatic registering device for the reading $c$ derived from a workpiece 5, and pipe 3 can be seen with the upstream jet device 1 supplied with compressed air under pressure Po, and the measuring jet device 2 arranged at the free end of a flexible pipe 21 connected to the downstream end of the pipe 3, of the device, for convenience of measuring. Parallel to the pipe 3 there is connected another pipe 22 equipped with an upstream jet device 1A similar to the upstream jet device 1 of the pipe 3. The pipe 22 communicates with the atmosphere through the annular space between a needle valve, 27 and a seat 28. Displacements of the needle valve 27 are controlled by a membrane 24 whose two faces are respectively submitted to the pressure prevailing in the pipes 3 and 22. The movements of the needle valve 27 are measured by means of a comparator 25.

FIG. 6 shows an embodiment of the device shown in FIG. 5, the same elements being referred to by the same reference numerals. The escape of air from the pipe 22 takes place through the annular space between a needle valve 27 and a seat 28, the said needle valve being pushed by a central disc 31 mounted on the membrane 24. The needle valve 27 pushes back the stem 33 of the comparator 25 by means of two studs 34, 35, fixed on a piece 36 which can slide, in opposition to a return spring 37, in a cylindrical part 38 which is fixed relative to the whole device.

During a measuring operation, the equilibrium of the memberane is established when the pressures prevailing on both sides of the latter are equal, i.e. when the section of the passage between the needle valve 27 and the annular seat 28 equals the section of the passage between the orifice 2 and the face 4 of the workpiece to be measured, if the sections of orifices 1 and 1A are, for example, equal. At this moment the position of the needle valve 27 determines the position of the needle of the comparator 25, which consequently shows the value of the measured reading $c$.

In this device, the two jet devices 1 and 1A are of the type shown in FIG. 4 i.e. their nozzles are of the type shown on a larger scale in FIG. 3.

Naturally, the invention is not limited to the embodiments described and illustrated; various modifications can be made, according to the applications envisaged, without however going beyond the scope of the invention.

I claim:
1. A jet device particularly for the flow of pressurised air, with discharge varying without discontinuity as a function of the pressure, said device comprising a jet body, a pipe traversing said body for the flow of a current of fluid through said body, said pipe having a cylindrical channel of calibrated diameter opening in the direction of the upstream part of the said current in a smooth, bell-mouthed orifice and terminating in the direction of the downstream part of the said current in a non-restrictive orifice, said cylindrical channel having a length of between about 0.5 to 1 times its diameter and being one of revolution, and said bell-mouthed orifice has a toric edge, defines the quadrant of a circle in diametrical section and joins without break in continuity the upstream end of said channel to the end of the jet body, which end is in a plane perpendicular to the axis of said channel, the radius of curvature of said toric edge being included between about 0.25 and 1 times the calibrated diameter of the cylindrical channel.

2. The jet device according to claim 1, in which the downstream orifice of the cylindrical channel comprises a truncated-conical bell mouth.

3. The jet device according to claim 2, in which the downstream truncated-conical bell mouth terminates at the downstream end of the jet body which is in a plane perpendicular to the axis of the cylindrical channel.

4. The jet device according to claim 3, in which the length of the truncated-conical bell mouth is between about 1 to 10 times the calibrated diameter of the cylindrical channel.

5. The jet device according to claim 4, in which conicity of the bell mouth is about 10 degrees.

6. The jet device according to claim 5, in which the calibrated diameter of the cylindrical channel is between 0.50 and 2.00 mm.

References Cited

FOREIGN PATENTS 644,739   9/1962   Italy.

LOUIS R. PRINCE, Primary Examiner

WILLIAM A. HENRY II, Assistant Examiner